(12) United States Patent
Waldron et al.

(10) Patent No.: US 6,234,683 B1
(45) Date of Patent: May 22, 2001

(54) FIELD REPAIRABLE HERMAPHRODITIC CONNECTOR

(75) Inventors: Mark R. Waldron, Poplar Grove, IL (US); Martin Crocker, Suffolk (GB); Philip Fick, Essex (GB); Alan Hagger, Suffolk (GB)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/395,074

(22) Filed: Sep. 13, 1999

(51) Int. Cl.[7] ....................................................... G02B 6/36
(52) U.S. Cl. ................. 385/78; 385/77; 385/81; 385/82; 385/83; 385/84
(58) Field of Search ................... 385/78, 77, 81, 385/82, 83, 84, 85, 86, 59, 60, 62, 53, 55

(56) References Cited

U.S. PATENT DOCUMENTS

| | | | |
|---|---|---|---|
| 4,174,882 | * 11/1979 | McCartney | 350/96.21 |
| 4,208,092 | 6/1980 | Monaghan et al. | 350/96.21 |
| 4,279,466 | 7/1981 | Makuch et al. | 350/96.21 |
| 4,291,941 | 9/1981 | Melzer | 350/96.18 |
| 4,657,340 | 4/1987 | Tanaka et al. | 350/96.2 |
| 4,787,706 | 11/1988 | Cannon, Jr. et al. | 350/96.2 |
| 4,934,785 | 6/1990 | Mathis et al. | 350/96.21 |
| 5,297,227 | * 3/1994 | Brown et al. | 385/56 |
| 5,481,634 | 1/1996 | Anderson et al. | 385/70 |
| 5,590,229 | 12/1996 | Goldman et al. | 385/59 |

FOREIGN PATENT DOCUMENTS

0011423OA1    8/1984  (GB) .

OTHER PUBLICATIONS

New Product Press Release "Methode Introduces a Complete Family of Small Form Factor LC Fiber Optic Connectors" (Jan. 21, 1999).
New Product Press Release "Methode Acquires Stratos, Ltd., a Leader in Expanded Beam Fiber Optic Connectors for Harsh Environments" (Jan. 20, 1999).

* cited by examiner

Primary Examiner—Mohammad Sikder
(74) Attorney, Agent, or Firm—Karl D. Kovach; David L. Newman

(57) ABSTRACT

A hermaphroditic fiber optic termination device including a plug insert removably insertable into a front of a housing. The housing having locking holes. The plug insert formed so as to receive ferrules surrounding terminal ends of the optical fibers. The plug insert having spring latches, where each spring latches has a nub. The nub feature being designed so as to spring into the locking holes of the housing.

20 Claims, 17 Drawing Sheets

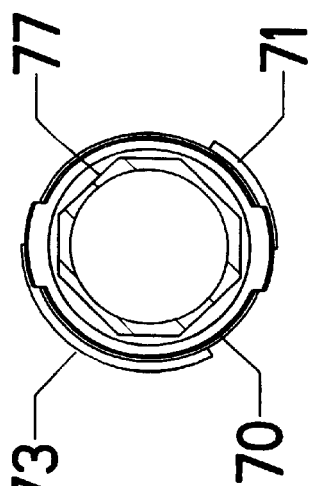
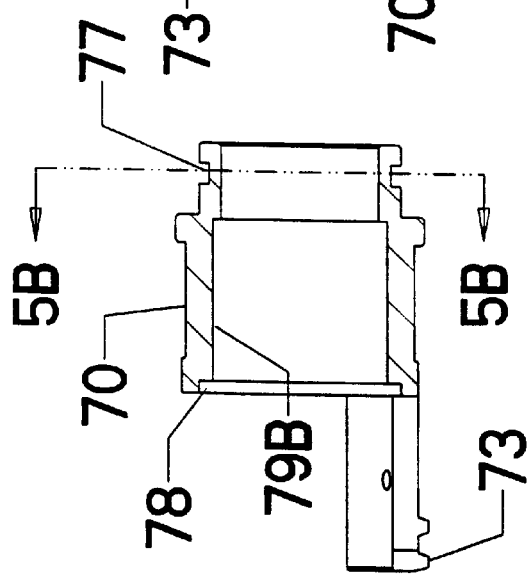
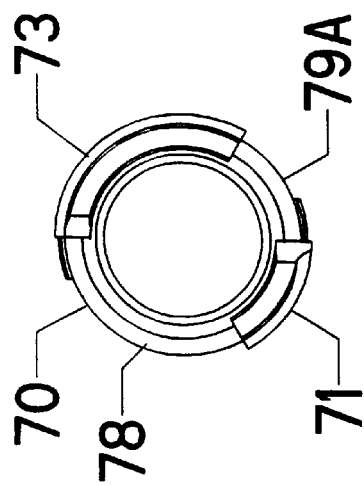
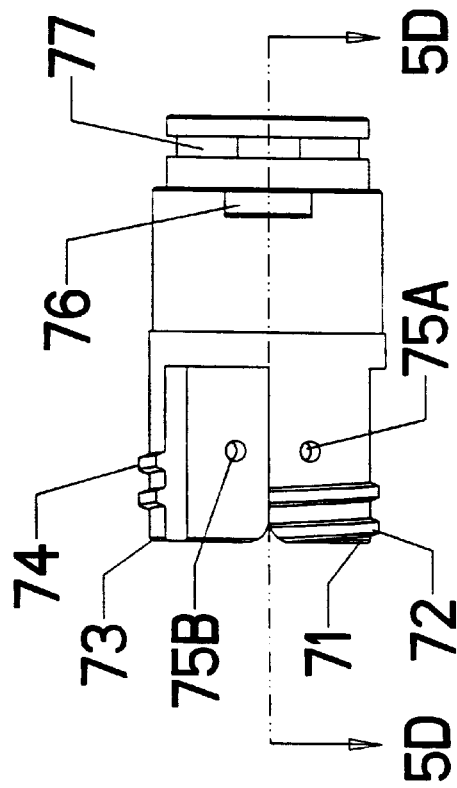

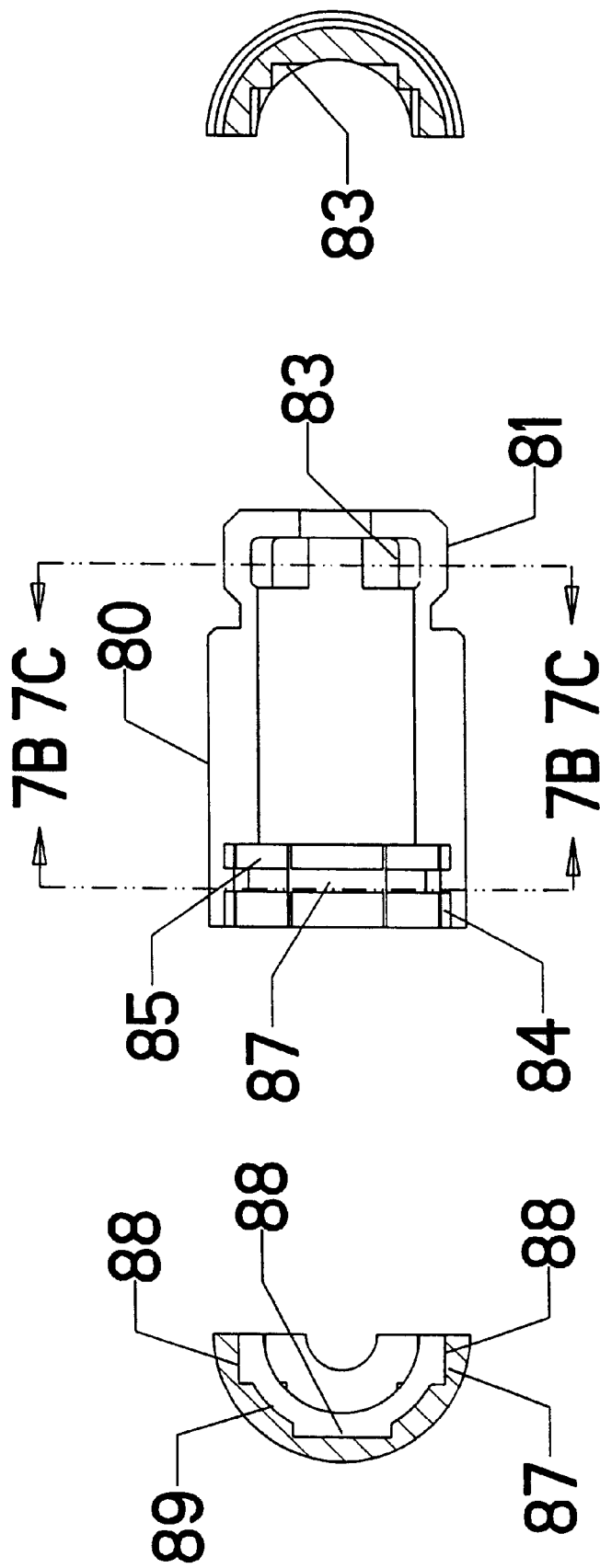

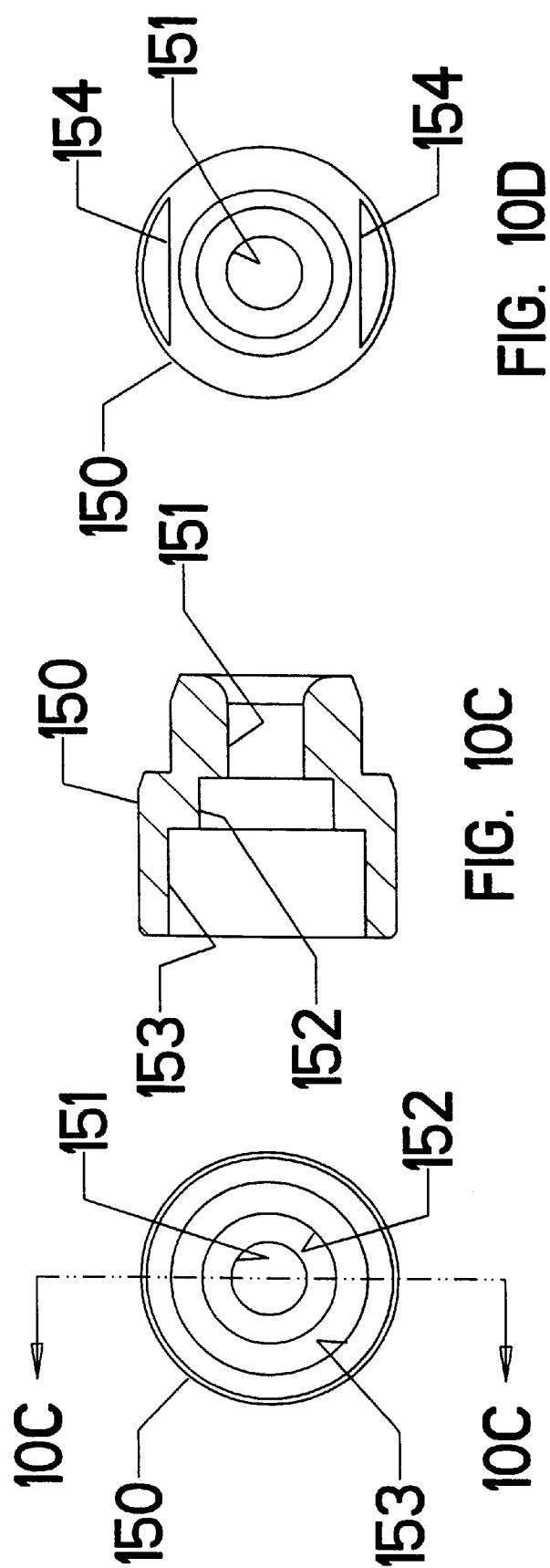

FIELD REPAIRABLE HERMAPHRODITIC CONNECTOR

BACKGROUND OF THE INVENTION

1. Field of the Invention

The present invention pertains to a termination of a fiber optic cable or waveguide. The invention more particularly concerns a termination that takes the form of a field repairable hermaphroditic connector.

21. Discussion of the Background

Presently, the control of fast, secured communication translates into power. Thus, secured communication lines are a highly valued commodity. Perhaps no where is the need for secured communications so desired as it is on the battlefield. Communication lines transmit data to coordinate the individual components of a larger unit. Communication lines transmit logistical data. Communication lines transmit data concerning the positions of enemy targets. Communication lines transmit data concerning strategic and tactical placement of ordinance and personnel. A breakdown of communications can result in disaster. Throughout history, effective communications have prevailed as a key element to successful military engagement.

In the past, communications which could not be secured on a single line were broadcast over the airwaves. To prevent others from knowing the contents of the communications, the communications were coded. The intended recipient of the coded message then decoded the communication to reveal the contents of the message. Military history is replete with examples of code breakers successfully uncovering the secrets contained within the coded communication.

Other methods were developed to secure communication lines, such as sending a communication over a dedicated wire cable. Such cables can be tapped or the electrical field can be used to induce an electrical current in another electrical device so that the communication can be monitored.

Another problem with communication lines is that slow or small amounts of transferred data is akin to no communication what-soever. Additionally, modern devices require an ever increasing amount of data so that the devices operate properly. Thus, there is a need for data communication transmission mediums which convey large amounts of information per unit time; i.e., a large bandwidth.

In the modern battlefield, it is envisioned that a command center will link together groups of tanks and artillery batteries with a series of secured communication cables. To overcome the problems described above, manufacturers developed fiber optic cable to convey military communications. The fiber optic cable is a secure, hard-wired, line of communication. A fiber optic cable can not be easily tapped as an electrical wire since optical signals do not induce electromagnetic fields as does an electrical wire conducting electricity. Furthermore, the fiber optic cable has a large bandwidth; that is, it conveys large amounts of information per unit time. The termination device of the fiber optic cable includes a lens forming a so-called expanded beam connector. The advantage of an expanded beam connector is that it is somewhat tolerant of environmental debris contaminating the union between the two termination devices. In practice, the lens expands the beam of light exiting the optic fiber. The other lens in the adjacent termination device takes the expanded beam of light and focuses it back down to a small point and introduces it into the optic fiber of the other cable. When a small amount of debris blocks a portion of the expanded light signal the communication is not corrupted. Thus the expanded beam termination device achieves one of the requirements of a battlefield communication device.

However, expanded beam termination devices have a downside, the insertion loss is relatively high. The insertion loss is high due to expanding the light beam. The expanding light beam is partially scattered and lost, thus, the signal looses power at each union of termination devices. The insertion loss prevents a number of the optical cables from being ganged together since the signal would eventually be lost at the end of the last optical cable; i.e., there would be no usable light energy emanating from the cable. Therefore, the distance between signal transmitting and signal receiving devices is limited unless expensive, cumbersome, power boosting, relay equipment is connected to the optical cable between the transmitting and receiving devices.

Another downside of expanded beam connector termination devices is that once the termination device becomes so fouled with environmental or other debris, it is very difficult, if not impossible, to clean and/or fix the termination device. Thus, the entire length of cable must be replaced, provided a replacement cable is available.

Furthermore, battlefield conditions require that the coupling of two termination devices be simple. Simplicity is an important design characteristic since a soldier may be mating together two termination devices in a dark battlefield. Battlefield conditions also require that the termination devices be structurally robust so as to withstand the repeated impacts imparted by military vehicles, explosive ordinance, and natural environmental calamities. However, even ordinary battlefield rigors and debris may take their toll on one or many termination devices thus necessitating their repair or replacement.

Thus, there is a need for a robust, field repairable termination device which has a low insertion loss when mated with another termination device and which is easily connected to another termination device in the field.

SUMMARY OF THE INVENTION

Therefore, it is an object of the present invention to provide a termination device for optical fibers which is robust, and easy to repair.

It is a further object of the invention to provide a termination device which is blind mateable in the field.

It is still yet another object of the invention to provide a termination device which has a low insertion loss when coupled with another termination device.

It is another object of the invention to provide a termination device which is hermaphroditic.

It is still another object of the invention to provide a termination device which is inexpensive to manufacture and assemble.

It is yet still another object of the invention to provide a termination device which is scoop proof.

It is yet another object of the invention to provide a tool for repairing the termination device of the invention.

In one form of the invention, the hermaphroditic termination device includes a housing and a plug insert removably insertable into the housing. The housing has a front end and mating structures projecting from the front end. The mating structures having locking holes. The mating structures are substantially identical to and mateable with a mating structure of a front end of another housing. The plug insert enters the housing from the front end thereof. The plug insert further has optical connector ports for receiving optical assemblys. Each optical assembly has an optic ferrule to which is attached an optic fiber. The plug insert has a first surface and a substantially cylindrical surface. The substantially cylindrical surface is substantially perpendicular to the first surface. The plug insert has nub features provided on the substantially cylindrical surface for mating with the locking holes of the housing. The first surface of the plug insert has a first ferrule port and a second ferrule port. The first ferrule port has a plug insert extension projecting from the first surface. The second ferrule port is dimensioned so as to receive a plug insert extension of another plug insert. The first optical connector receiving port communicates with the second ferrule port, and the second optical receiving port communicates with the first ferrule port.

In another form of the invention, a tool for inserting and removing a plug insert for the termination device includes a body, a plunger, a pin, and a spring. The body has a main aperture formed through the length of the body. The main aperture also has a spring seat formed therein. The body also has a pin travel aperture formed through a diameter of the body and substantially perpendicular to the main aperture. The body has a first end and a second end. The first end includes a first friction grip and a second friction grip, where the first and second friction grips react a force supplied by compressed spring latches of the plug insert. The first and second friction grips engage the spring latches over a first distance. The plunger has a large diameter region and a small diameter region. The large diameter region having a spring seat formed thereon. A portion of both the small diameter region and the large diameter region are slidably provided in the main aperture of the body. The large diameter region has a pin receiving aperture. The large diameter region has a free end which acts as an actuation surface. The actuation surface of the plunger extends beyond the second end of the body. The small diameter region of the plunger has a free end which acts as a release surface. The release surface translating through a second distance when the plunger is fully actuated by being translated. The second distance being greater than the first distance. The pin is press-fitted into the pin receiving aperture of the plunger. The pin is also provided in the pin travel aperture of the body. A clearance exists between the pin and the surfaces of the pin travel aperture which allows the pin to translate within the pin travel aperture. The clearance between the pin and the surface of the pin travel aperture is at least as great as the second distance. In an unreleased state, the pin contacts a portion of the surface of the pin travel aperture. The spring is provided in the main aperture of the body. The spring surrounds a portion of the small diameter region of the plunger. The spring is in a state of compression and reacts compression forces against the first and second spring seats.

Thus, Applicants' invention provides a termination device which is compact, easy to repair, scoop proof, hermaphroditic, inexpensive to manufacture and assemble, blind mateable, and which has a low insertion loss. These and other features of the invention are set forth below in the following detailed description of the preferred embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A is a side view of the housing of FIG. 1;

FIG. 5B is a cross-sectional view of the housing taken along section line 5B—5B of FIG. 5D;

FIG. 5C is an end view of the insertion end of the housing of FIG. 5A;

FIG. 5D is a cross-sectional view of the housing taken along section line 5D—5D of FIG. 5A;

FIG. 7A is a side view of the extension sleeve half of FIG. 1;

FIG. 7B is a cross-sectional view of the extension sleeve half taken along section line 7B—7B of FIG. 7A;

FIG. 7C is a cross-sectional view of the extension sleeve half taken along section line 7C—7C of FIG. 7A;

FIG. 10A is a side view of the back end plug of FIG. 1;

FIG. 10B is an end view of the back end plug of FIG. 10A;

FIG. 10C is a cross-sectional view of the back end plug taken along section line 10C—10C of FIG. 10B;

FIG. 10D is an end view of another end of the back end plug;

DETAILED DESCRIPTION OF THE PRESENTLY PREFERRED EMBODIMENTS

Figure 1:
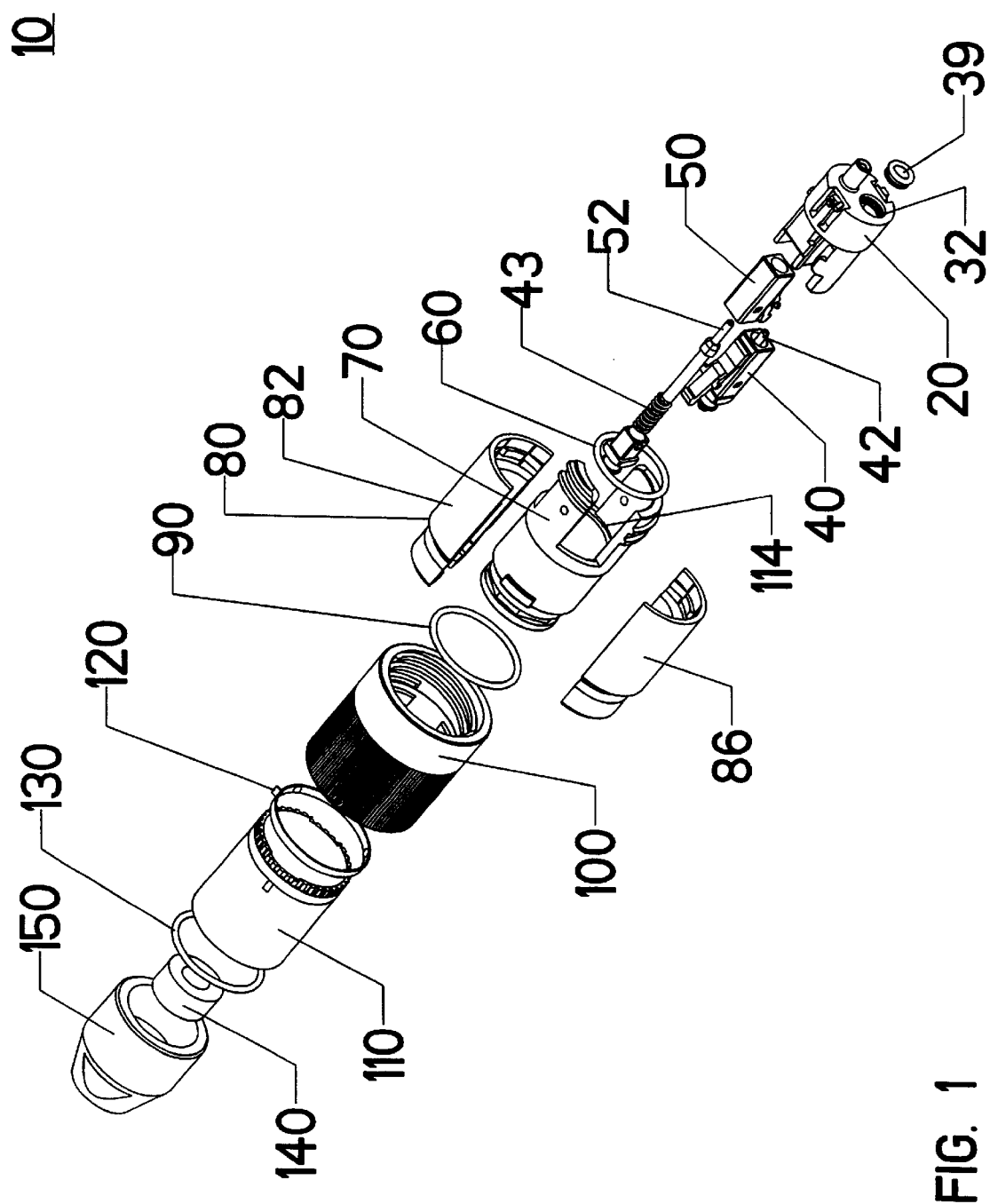
FIG. 1 is an exploded perspective view of a termination device according to the invention.

Referring now to the drawings, wherein like reference numerals designate identical or corresponding parts throughout the several views, and more particularly to FIGS. 1–11 thereof, a first embodiment of the present new invention is a termination device 10.

FIG. 1 is an exploded, perspective view of the hermaphroditic termination device 10. The termination device 10 includes a housing 70, a plug insert 20, fiber optic connectors or assemblies 40, 50, an extension sleeve 80, a grip ring 100, a cover tube 110, a click ring 120, a cable seal 140, a back end plug 150, and associated seals 39, 60, 90, 130. As can be seen, the fiber optic assemblies or connectors 40 and 50 are removeably insertable into the plug insert 20. Likewise, the plug insert 20, containing the fiber optic assemblies 40 and 50, is insertible into the housing 70. Not shown in FIG. 1 are the optical fibers associated with an optical cable and a crimp sleeve (see FIG. 3). At the time of the assembly, each of the fiber optic assemblies 40, 50 are associated with a corresponding optical fiber. However, for purposes of clarity, FIG. 1 does not show the optical fibers. Also not shown is the crimp sleeve which is then surrounded by the two halves 82, 86 of the extension sleeve 80. At the same time, the extension sleeve 80 surrounds a portion of the housing 70. The extension sleeve 80 acts as a strain relief member so as to remove any physical loading to the optical fibers by transferring such loads from the optical cable through the crimp sleeve to the extension sleeve 80. The extension sleeve 80 then transfers the forces to the housing 70. Next the cover tube 110 and click ring 120 are slid over the extension sleeve 80. The cover tube 110 prevents the two halves 82, 86 of the extension sleeve 80 from becoming misaligned. Grip ring 100 is then slid over the cover tube 110. To retain the cover tube 110 in its location, a back end plug 150 is secured against the cover tube 110. The back end plug 150 is threadedly engaged with a portion of the extension sleeve 80. Placed between the portion of the extension sleeve 80 and the back end plug 150 is a cable seal 140.

Figure 2:
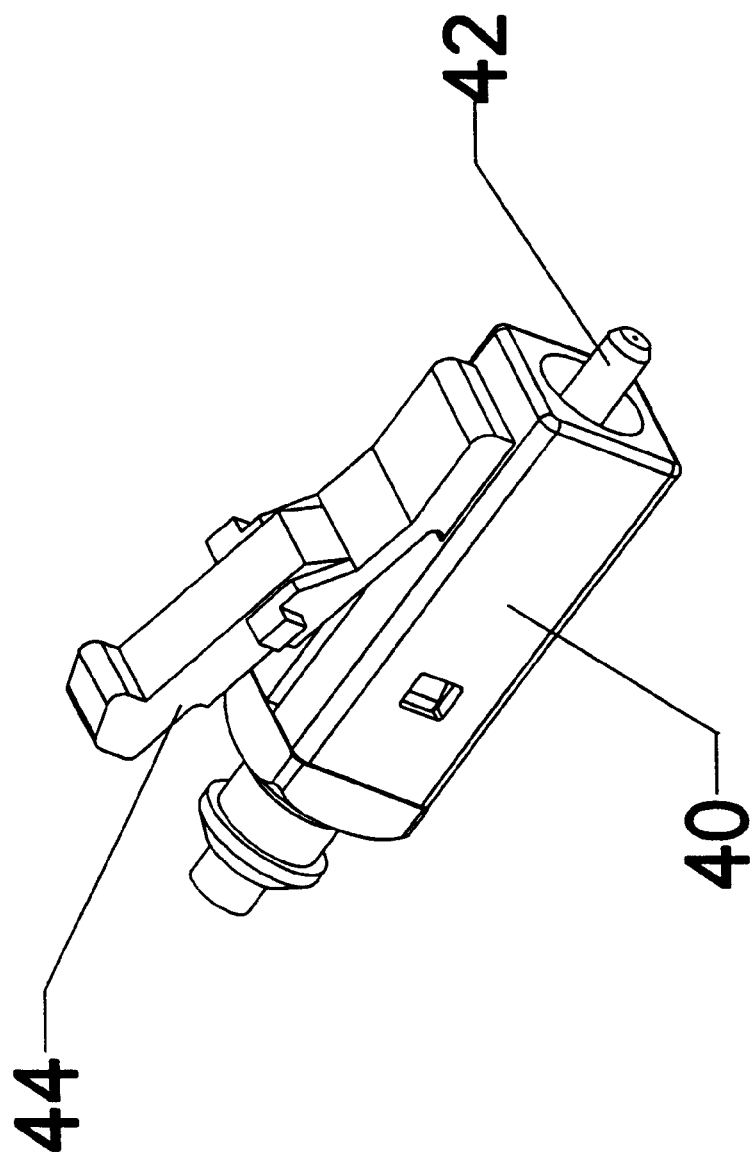
FIG. 2 is a perspective view of a fiber optic assembly of FIG. 1.

FIG. 2 is a perspective view of one of the fiber optic connectors 40, 50. For description purposes both of the connectors or assemblies are identical and as such discussion will be focused upon the fiber optic connector or assembly 40. The fiber optic assembly 40 is an RJ-type of connector. The fiber optic assembly 40 includes a cantilevered spring latch 44 and a ferrule 42. In a preferred body embodiment, the ferrule 42 has an outside diameter of approximately 1.25 mm. By way of example, Methode Electronics, Inc., manufactures such an assembly or connector known as a small form factor LC fiber optic connector.

Figure 3:
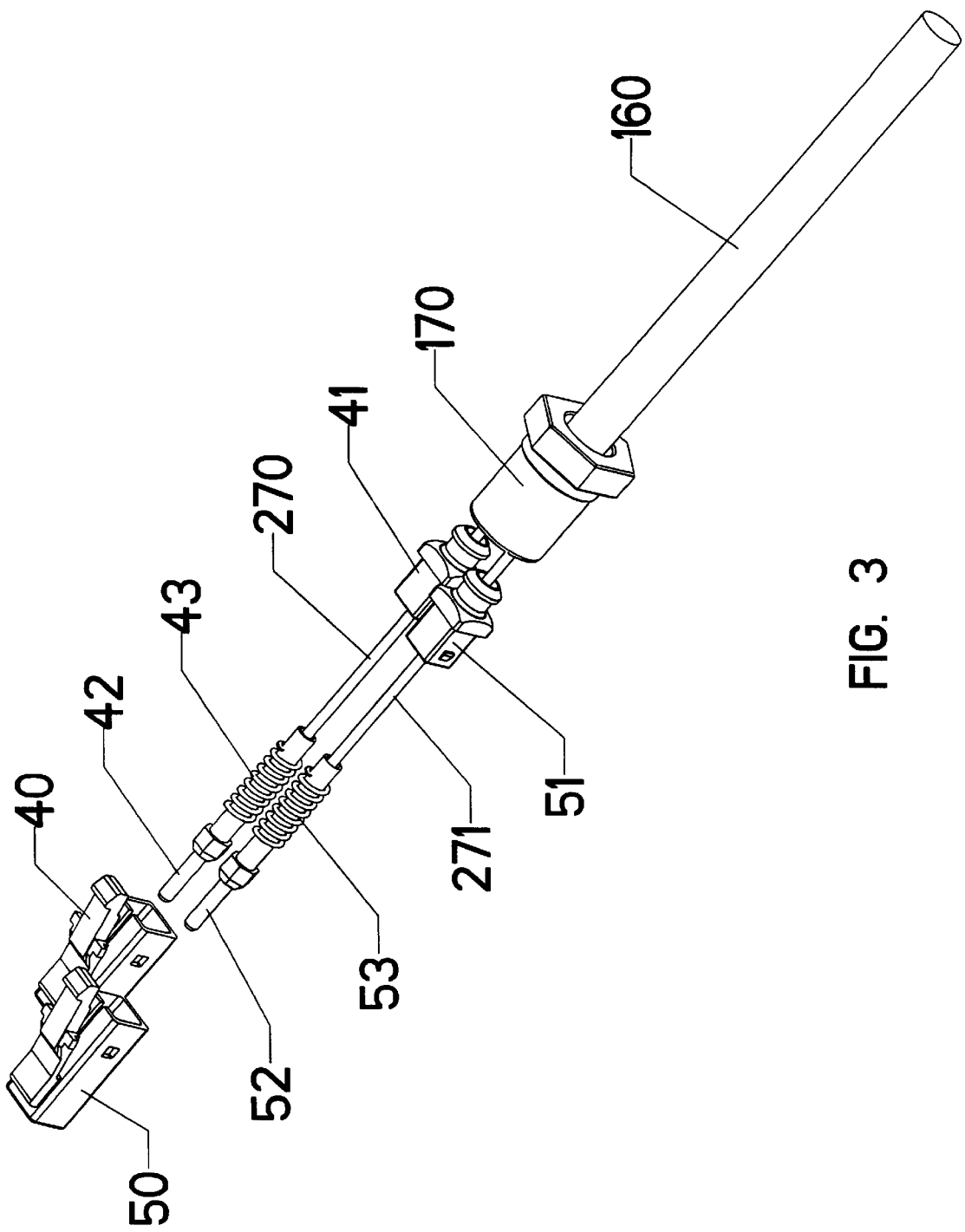
FIG. 3 is an exploded, perspective view of the two fiber optic assemblies connected to optical fibers, and a crimp sleeve and a cable.

FIG. 3 is an exploded perspective view of two fiber optic RJ-type assemblies or connectors 40, 50, connected to optical fibers 270, 271. The optical fibers 270, 271 are individually removed from the optical cable 160. To prevent insulation and other coatings from escaping the optic cable 160, a crimp sleeve 170 surrounds the exposed portion of the optical cable 160 and the optical fibers 270, 271 and is then secured in place by permanently, plastically deforming the metallic material of the crimp sleeve 170. The other ends of the optical fibers 270, 271 terminate in the fiber optic assemblies 40, 50. FIG. 3 shows that each assembly 40, 50 has an associated connector spring 43, 53. Connector covers 41, 51, enclose the ferrules 42, 52, and the connector springs 43, 53 in the connector package. The connector springs 43, 53 allow the ferrules 42, 52 to be pushed inward so as to compress the connector springs 43, 53 and allow the ferrules 42, 52 to float. Floating is important so that when the butt joint is created, when contacting ferrule ends meet in the alignment sleeve, they move so as to co-axially align the associated optical fibers thus reducing coupling losses, especially as compared to expanded beam connectors.

Figure 4C:
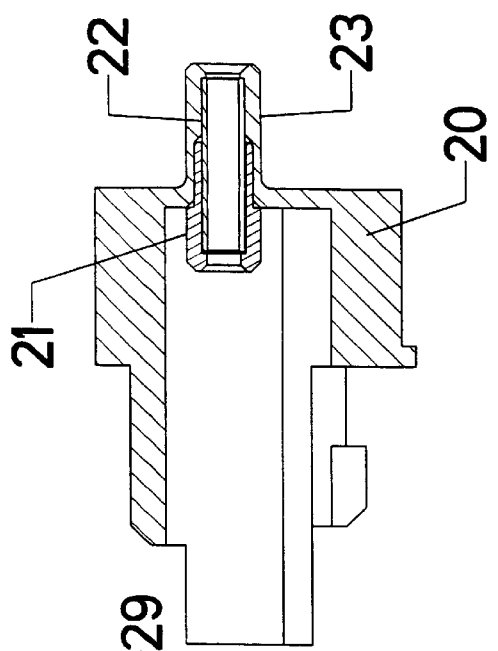
FIG. 4C is a cross-sectional view taken along section line 4C—4C of FIG. 4B.
Figure 4B:
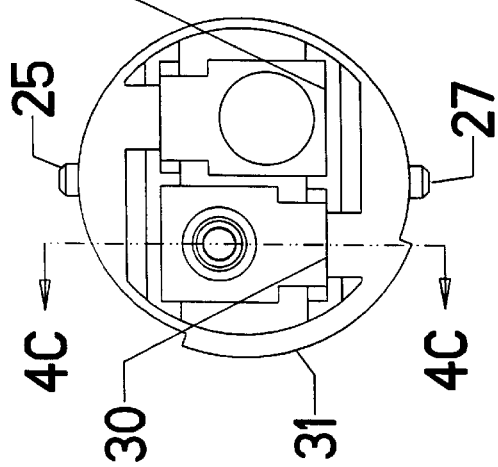
FIG. 4B is an end view of the plug insert of FIG. 4A.
Figure 4A:
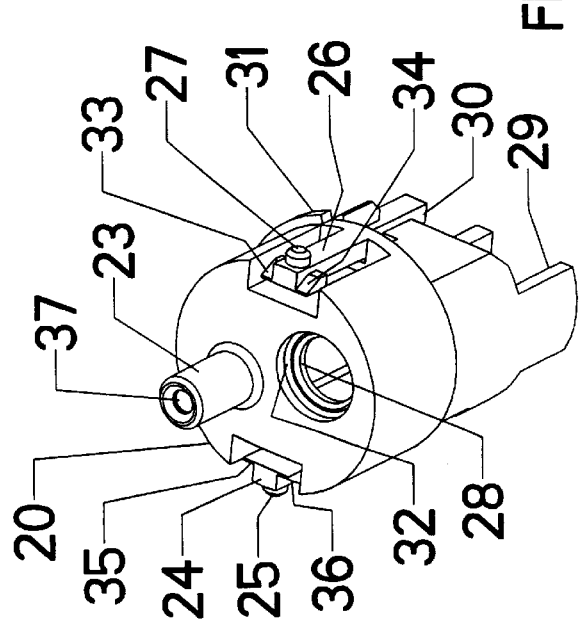
FIG. 4A is a perspective view of the plug insert of FIG. 1.

FIG. 4A is a perspective view of the plug insert 20. Plug insert 20 includes first and second connector receiving ports 29, 30 for receiving fiber optic assemblies 40, 50. The first and second connector receiving ports 29, 30 include features that depress the cantilevered spring latches 44, 54 of the fiber optic assemblies 40, 50 and then upon further insertion, the spring latches 44, 54 expand in the first and second connector receiving ports 29, 30 so as to securely attach the fiber optic assemblies 40, 50 to the plug insert 20. The first and second connector receiving ports 29, 30 align the ferrules 42, 52 of the fiber optic assemblies 40, 50 with respective ferrule apertures 28, 37. Associated with first ferrule receiving port or aperture 37 is a plug insert extension 23. The second ferrule aperture or port 28 has associated therewith a front seal seat 32. The front seal seat 32 accepts a front seal 39 (see FIG. 1). A ridge 31 is formed along a portion of a circumference of the plug insert 20. Diametrically opposed to each other are first and second cantilevered spring latches 24, 26. The first cantilevered spring latch 24 includes a first nub feature 25 protruding outward. Located on either side of the first nub feature 25 are tool slide surfaces 35, 36. The second cantilevered spring 26 is constructed in a similar manner having the nub feature 27 protruding outwards and having tool slide surfaces 33, 34. Each of the first and second cantilevered spring latches 24, 26 are mounted so as to be depressed inwards towards each other by at least a distance equal to the amount of each nub features' 25, 27 outward protruding distance.

FIG. 4B is an end view of the plug insert 20 further showing the protrusion of the first and second nub features 25, 27. FIG. 4B further shows features of the first and second connector receiving ports 29, 30 and the ridge 31.

FIG. 4C in a cross-sectional view taken along section line 4C—4C of FIG. 4B. FIG. 4C illustrates the internal construction of the plug insert 20 which includes the plug insert extension 23, a retainer 21, and an alignment sleeve 22. In practice, the alignment sleeve 22 is pushed into the retainer 21. Thereafter, the assembled retainer 21 and alignment sleeve 22 are inserted into the plug insert extension 23. Preferably, the alignment sleeve 22 is a split sleeve made of a metallic material.

FIG. 5A is a side view of the housing 70. The housing 70 includes a first key 71 and a second key 73 projecting from a front end thereof. The first key 71 has a first thread form 72 and the second key 73 has a second thread form 74 formed thereon. Preferably, each thread form 72, 74 includes two threads where each thread has a removed portion due to the formation of the keys. The first key 71 has a first locking hole 75A, and the second key 73 has a second locking hole 75B. At an end of the housing 70 away from the first and second keys 71, 73 is an octagon lock 77. Positioned between the octagon lock 77 and the first and the second keys 71, 73 is a retainer 76.

FIG. 5B is a cross-sectional view of the housing 70 taken along section line 5B—5B of FIG. 5D. FIG. 5B further shows the details of the octagon lock 77. Also shown in further detail are portions of the first and second keys 71, 73.

FIG. 5C is an end view of the front or insertion end of the housing 70. The insertion end of the housing 70 is so named since it is the end into which the plug insert 20 is mated. FIG. 5C shows a stopping surface 78 and a second surface 79A. Furthermore, additional features of the first and second keys 71, 73 are disclosed.

FIG. 5D is a cross-sectional view of the housing taken along section line 5D—5D of FIG. 5A. FIG. 5D discloses additional details of the second key 73 and the stopping surface 78. Additional details of the octagon lock 77 are also disclosed. Internal surface 79B is shown which is substantially cylindrical about a longitudinal axis.

Figure 6:
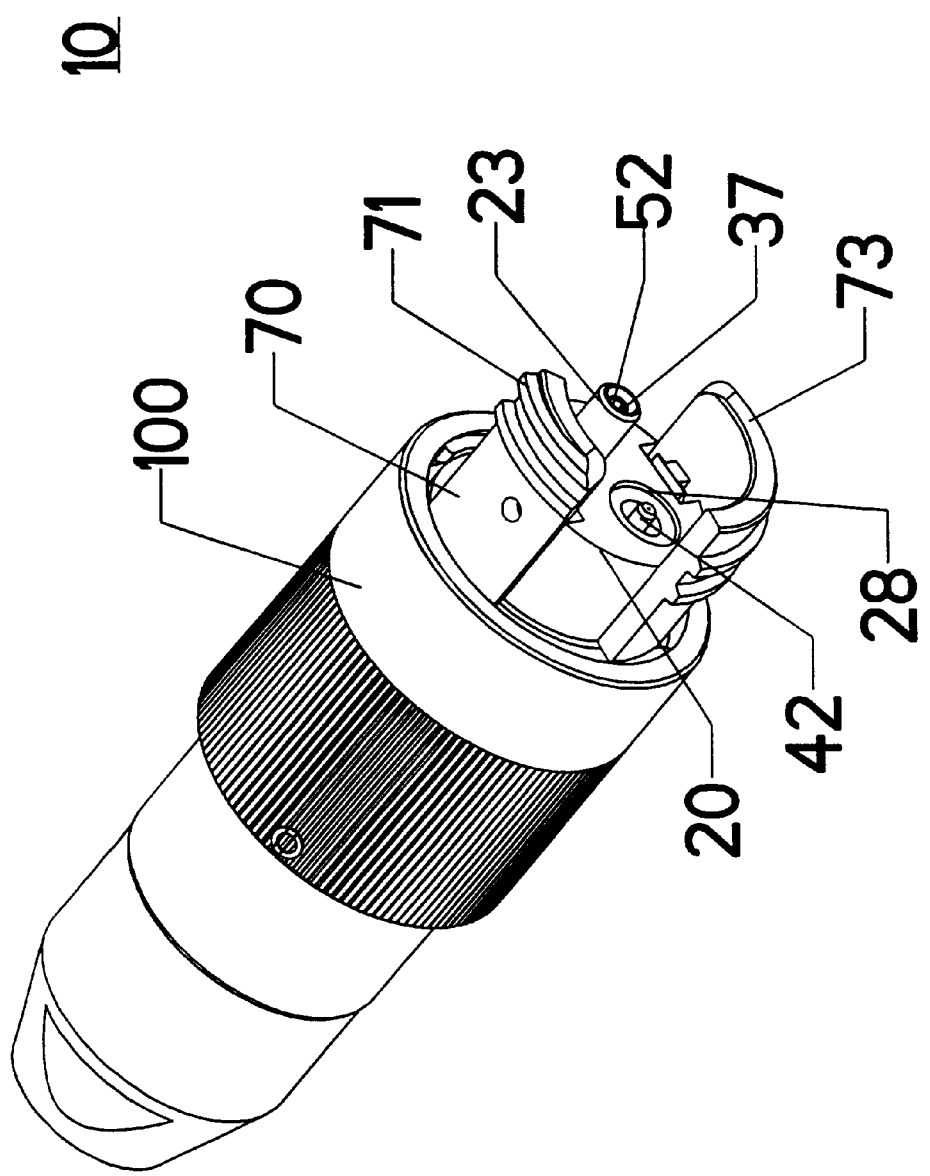
FIG. 6 is a partial perspective view of the housing, plug insert, grip ring, and fiber optic connectors of FIG. 1.

FIG. 6 is a partial perspective view of the housing 70, plug insert 20, grip ring 100 and the fiber optic connectors 40, 50, connected to their respective ferrules 42, 52. FIG. 6 is important so as to show the relative positioning of the second ferrule aperture or port 28 relative to the second key 73, and the positioning of the first ferrule port 37 and its associated plug insert extension 23 relative to the first key 71. In practice, when two misaligned hermaphroditic termination devices are attempted to be joined, it is noted that the ferrule 42 will not be knocked over or destroyed since the ferrule 42 is protected by the adjacent second key 73 from one direction and by the first key 71 and the plug insert extension 23 from the other directions. Such a termination device having these design features is known as being scoop-proof. It is more likely than not likely that the only structural feature of a substantially identical hermaphroditic termination device that will touch the ferrule 42 is the plug insert extension and associated split sleeve and ferrule of the termination device, as is intended. The scoop proof feature adds to the durability of the termination device 10.

FIG. 7A is a side view of one half 82, 86 of the extension sleeve 80. Each half 82, 86 of the extension sleeve 80 is essentially identical. Each half 82, 86 of the extension sleeve 80 has a thread form 81, a first anti-rotation surface 83, a second anti-rotation surface 87, a first groove 84 and a second groove 85.

FIG. 7B is a cross-sectional view of the one-half 82, 86 of the extension sleeve 80 taken along section line 7B—7B of FIG. 7A. FIG. 7B shows the shape of the second anti-rotation surface 87. The second anti-rotation surface 87 includes flat portions 88 and curved portions 89.

FIG. 7C is a cross-sectional view of one-half 82, 86 of the extension sleeve 80 taken along section line 7C—7C of FIG. 7A. FIG. 7C shows the general shape of the first anti-rotation surface 83, which is generally constructed of linear segments.

Figure 8B:
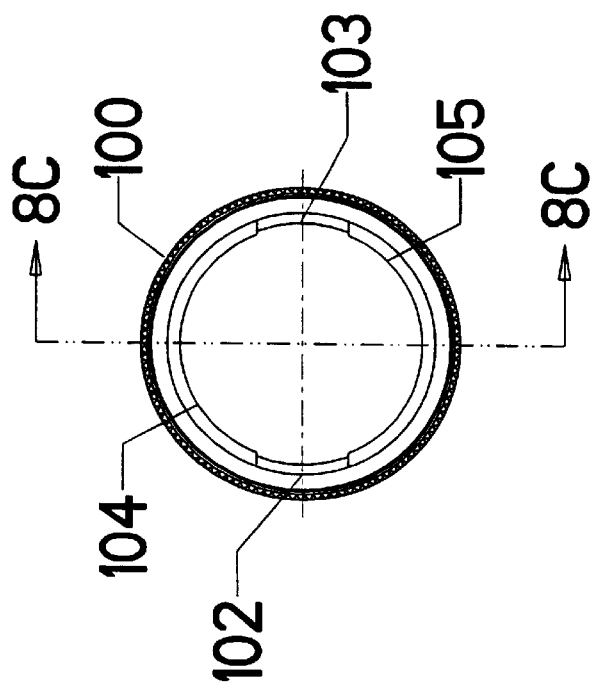
FIG. 8B is an end view of the grip ring of FIG. 8A.
Figure 8C:
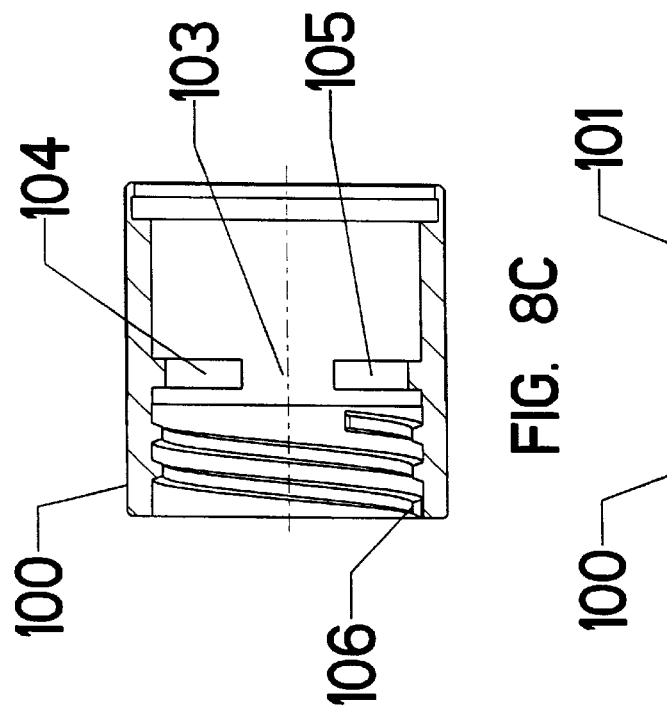
FIG. 8C is a cross-sectional view of the grip ring taken along section line 8C—8C of FIG. 8B.
Figure 8A:
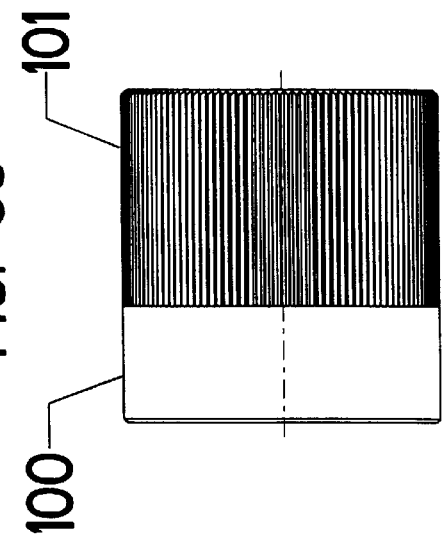
FIG. 8A is a side view of the grip ring of FIG. 1.

FIG. 8A is a side view of the grip ring 100. FIG. 8A shows a knurled surface 101 of the grip ring 100.

FIG. 8B is an end view of the grip ring 100. FIG. 8B shows a first grip ring retainerway 102 and a second grip ring retainerway 103, and a first web 104 and a second web 105.

FIG. 8C is a cross-sectional view of the grip ring 100 taken along section line 8C—8C of FIG. 8B. FIG. 8C further shows details of the first and second webs 104, 105 and the second grip ring retainerway 103. A grip ring thread form 106 is shown on an interior circumferential surface.

Figure 9A:
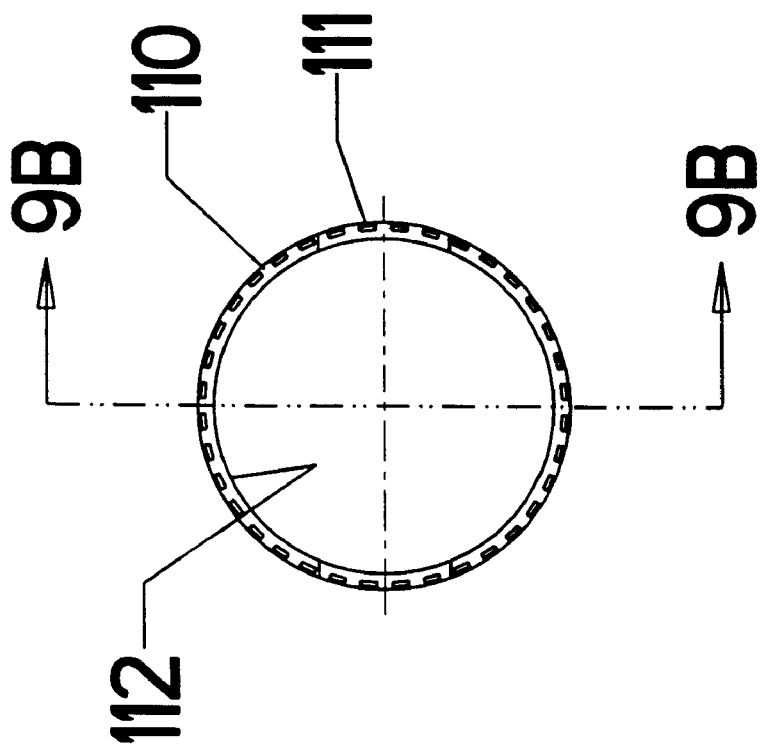
FIG. 9A is an end view of the cover tube of FIG. 1.

FIG. 9A is an end view of the cover tube 110. FIG. 9A illustrates a cover tube aperture 112 and cover tube undulations 111 formed on an outer cylindrical surface of the cover tube 110.

Figure 9B:
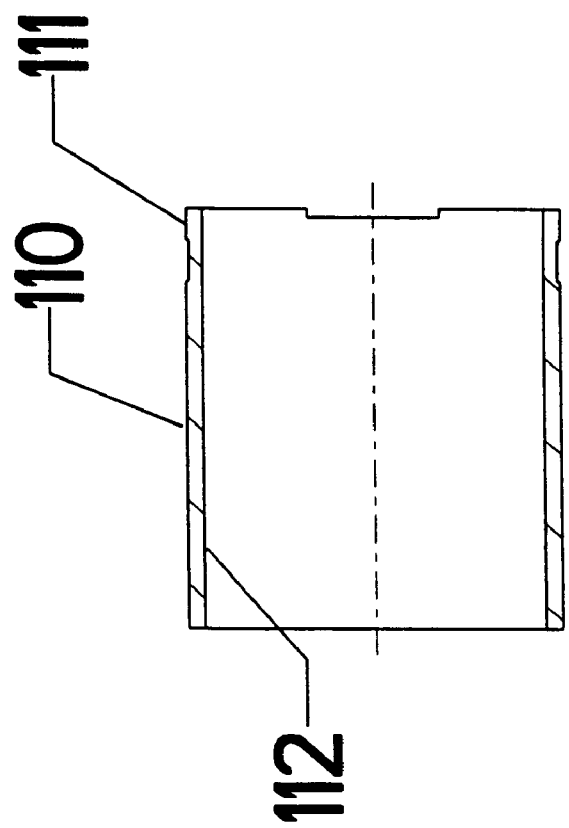
FIG. 9B is a cross-sectional view of the cover tube taken along section line 9B—9B of FIG. 9A.

FIG. 9B is a cross-sectional view of the cover tube 110 taken along section line 9B—9B of FIG. 9A. FIG. 9B shows further details of the cover tube undulations 111 and the cover tube aperture 112.

FIG.10A is a side view of the back end plug 150. FIG. 10A further shows one of the gripping lands 154.

FIG. 10B is an end view of the back end plug 150. FIG. 10B further shows a cable aperture 151, a cable seal seat 152, and a thread form 153.

FIG. 10C is a cross-sectional view of the back end plug 150 taken along section line 10C—10C of FIG. 10B. FIG. 10C further shows details of the thread form 153 located on an internal cylindrical surface of the back end plug 150, along with details of the cable aperture 151, and the cable seal seat 152.

FIG. 10D is end view of another end of the back end plug 150. FIG. 10D shows additional details of the cable aperture 151 and the gripping lands 154.

Figure 11B:
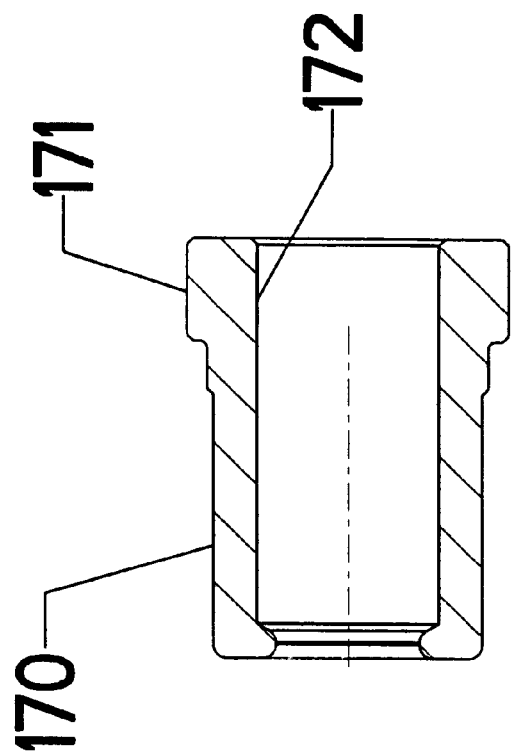
FIG. 11B is a cross-sectional view of the crimp sleeve taken along section line 11B—11B of FIG. 11A.
Figure 11A:
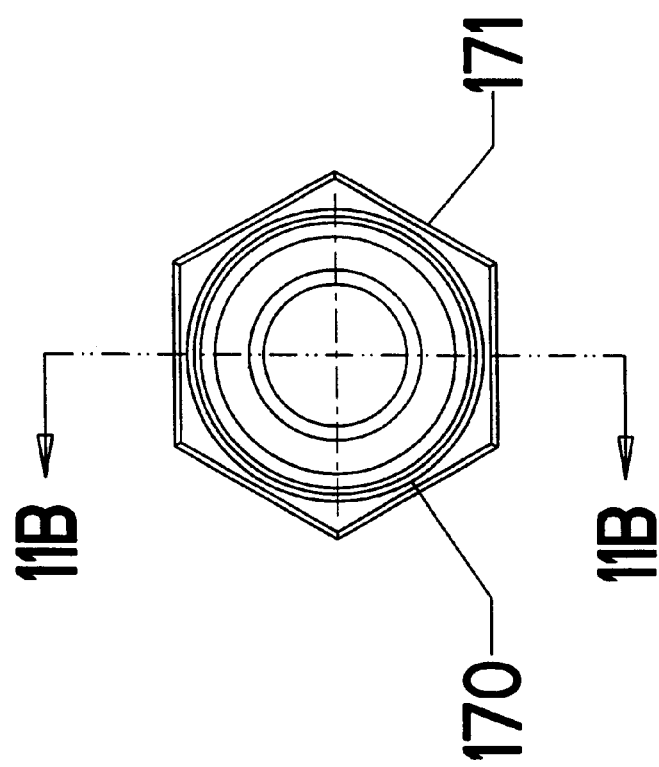
FIG. 11A is an end view of a crimp sleeve.

FIG. 11A is an end view of the crimp sleeve 170. The crimp sleeve 170 includes a hexagonal anti-rotational surface 171.

FIG. 11B is a cross-sectional view of the crimp sleeve 170 taken along section line 11B—11B of FIG. 11A. FIG. 11B further shows a detail of the crimp sleeve aperture 172.

In practice, the back end plug 150 and the cable seal 140 are slid over an end of the optical cable 160. The, optical cable 160 has optical fibers 270, 271 exposed. Then a crimp sleeve 170 is placed around a proportion of the optical cable 160 where the optical fibers 270, 271 are left unprotected. The crimp sleeve 170 is then mechanically crimped or compressed so as to drastically deform the metallic material thus securing, in place, the crimp sleeve 170 which prevents the optical cable 160 from becoming unraveled. As shown in FIG. 3, the free ends of the optical fibers 270, 271 are then associated with the respective ferrules 42, 52. The ferrules 42, 52 are then enclosed in their respective connector housings 40, 50.

Then, the cover tube 110, the grip ring 100, the click ring 120, and the housing 70 are slipped over the end optical cable so as to expose the fiber optic connectors 40, 50. Then, one-half 82 of the extension sleeve 80 is positioned near the hexagonal anti-rotational feature 171 of the crimp sleeve 170 and the octagon lock 77 on the housing 70. The first anti-rotational surface 83 of the extension sleeve half 82 is mated with the hexagonal anti-rotational feature 171 of the crimp sleeve 170 (FIG. 11B). The second anti-rotational surface 87 of the one-half 82 of the extension sleeve 80 is mated with the octagon lock 77 of the housing 70 (FIG. 5A). The second half 86 of the extension sleeve 80 is then similarly joined to the crimp sleeve 170 and the housing 70. The cover tube 110 is then slid over the assembly of the first and second halves 82, 86 of the extension sleeve 80 so as to prevent the first and second halves 82, 86 of the extension sleeve 80 from moving away from each other. The anti-rotational features of the extension sleeve 80, the housing 70, and the crimp sleeve 170 prevent any relative rotation and translation between those components, furthermore, the extension sleeve 80 acts as a strain relief member so that optic fibers 270, 271 do not carry any mechanical forces.

Next, the cable seal 140 is pushed up against the end of the extension sleeve 80. In order to secure the extension sleeve 80 in the cover tube 110, the bottom end plug 150 is slid up the optical cable 160 so as to be adjacent to the thread form 81 of the extension sleeve 80. The back end plug 150 is then rotated so as to engage thread form 153 of the back end plug 150 with the thread form 81 of the extension sleeve 80. The back end plug 150 is further rotated until the back end plug 150 is unable to be rotated any further. However, before the back end plug 150 is threaded onto the thread 81 of the extension sleeve 80 a rear seal 130 is placed between the back end plug 150 and the cover tube 110. The gripping land 154 portion of the back end plug 150 shown in FIGS. 10A and 10B are used to rotate the back end plug 150 onto the thread form 81 of the extension sleeve 80. The back end plug 150 is so torqued to a limit so that it is locked onto the threads of the extension sleeve 80. The back end plug 150 is positively secured to the extension sleeve 80 by way of a boot (not shown). Next, the grip seal 90 is set in a seal groove within the grip ring 100, and the click ring 120 is set in the grip ring 100. The assembly of the grip ring 100 and the click ring 120 is slid over the cover tube 110. The retainerways 102, 103 of the grip ring 100 pass by the retainer 76 of the housing 70.

The middle seal 60 is then introduced into the seal groove 114 of the housing 70. At this point, nearly all of the components are assembled. However, the plug insert 20 is not yet associated with the other components. At such a time, each of the fiber optic connectors 40, 50 are introduced into their respective connector receiving ports 29, 30 of the plug insert 20. The cantilevered spring latches 44, 54 click into place in the connector receiver ports 29, 30 of the plug insert 20. Next, the front seal 39 is positioned into the front seal seat 32 of the second ferrule aperture 28. Then, the plug insert 20 is introduced into the housing 70.

The plug insert 20 is preferably introduced into the housing 70 by way of a special tool as will be described later. The tool introduces the plug insert 20 into the housing 70. The ridge 31 and the nub feature 25 are positioned so as to be located between the largest arc length available between the first key 71 and the second key 73 of the housing 70. At such a location, the plug insert 20 is easily pushed into the slip fit created between the two parts until the ridge 31 of the plug insert 20 contacts the stopping surface 78 of the housing 70. At that time, the plug insert 20 is rotated so as to engage the nub feature 25 of the first cantilevered spring lock 24 with the second locking hole 75B of the second key 73 and the second nub feature 27 of the second cantilevered spring lock 26 with the first locking hole 75A of the first key 73. At that location, the nub features 25, 27 spring back to their substantially undeflected positions and engage the locking holes 75 and 75B, thus locking the plug insert 20 of the housing 70.

In a preferred embodiment, the arc length of the first key 71 is 60° and the arc length of the second key 73 is 120°. So as to be hermaphroditic with other like devices, the first key 71 is separated from the second key 73 by an arc length of 60° on one side and by an arc length of 120° on the other side.

Therefore, this arrangement of components is critical, since the plug insert 20 can be removed from the front of the housing 70 by way of a tool as will be described later. Such disassembling of the termination device 10 allows for easy repair. At the time of repair, the tool removes the plug insert 20 from the housing 70. The fiber optic connectors 40, 50 are easily removed from the plug insert 20 by way of depressing their associated cantilevered spring latches 44, 54. The plug insert can then be discarded and replaced or repaired or the ferrules 42, 52 can be polished so as to eliminate environmental contaminants and debris. The device is again easily assembled by inserting the fiber optic connectors 40, 50 into the plug insert 20 and then inserting the plug insert 20 into the housing 70. The fiber optic device 10 is then ready to be used.

As is noticeable in the figures, the plug insert 20 can mate to another plug insert having similar features and dimensions. The plug insert extension 23 of one plug insert 20 is insertable into the second ferrule port or aperture 28 of the other plug insert and makes a seal with a front seal 39. Likewise, the plug insert extension of the other plug insert mates into the second aperture of the first plug insert. At such a time, the ferrules butt up against each other and compress the springs 43, 53 of the connectors 40, 50 so as to place the ferrules in a state of flotation so as to ensure a good, tight butt joint. Likewise, the keys of the housings 70 of the termination device interact with one another where the first key of one of the housings is situated between the first and second keys of the other housing and the second key of the first housing is positioned between the first and second keys of the other housing so as to make for a fully hermaphroditic termination device. The grip ring 100 is then slid forward so as to engage the threads of 72, 74 of the first termination device housing 70 with the threads 106 of the grip ring 100 of the second termination device. The grip ring 100 is further engaged downward on the threads of the first housing until the click ring 120 positioned in the grip ring 100 translates far enough along the cover tube 110 so as engage the undulations 111 causing audible noise which indicates that the grip ring 100 is fully threaded onto the first housing. Likewise, the grip ring of the first termination device is slid forward so as to engage the thread forms on the second housing 70 and is engaged until audible noises are heard due to the undulations of the cover tube coming into contact with the grip ring. At such a position, the union is complete between the two termination devices.

Figure 12:
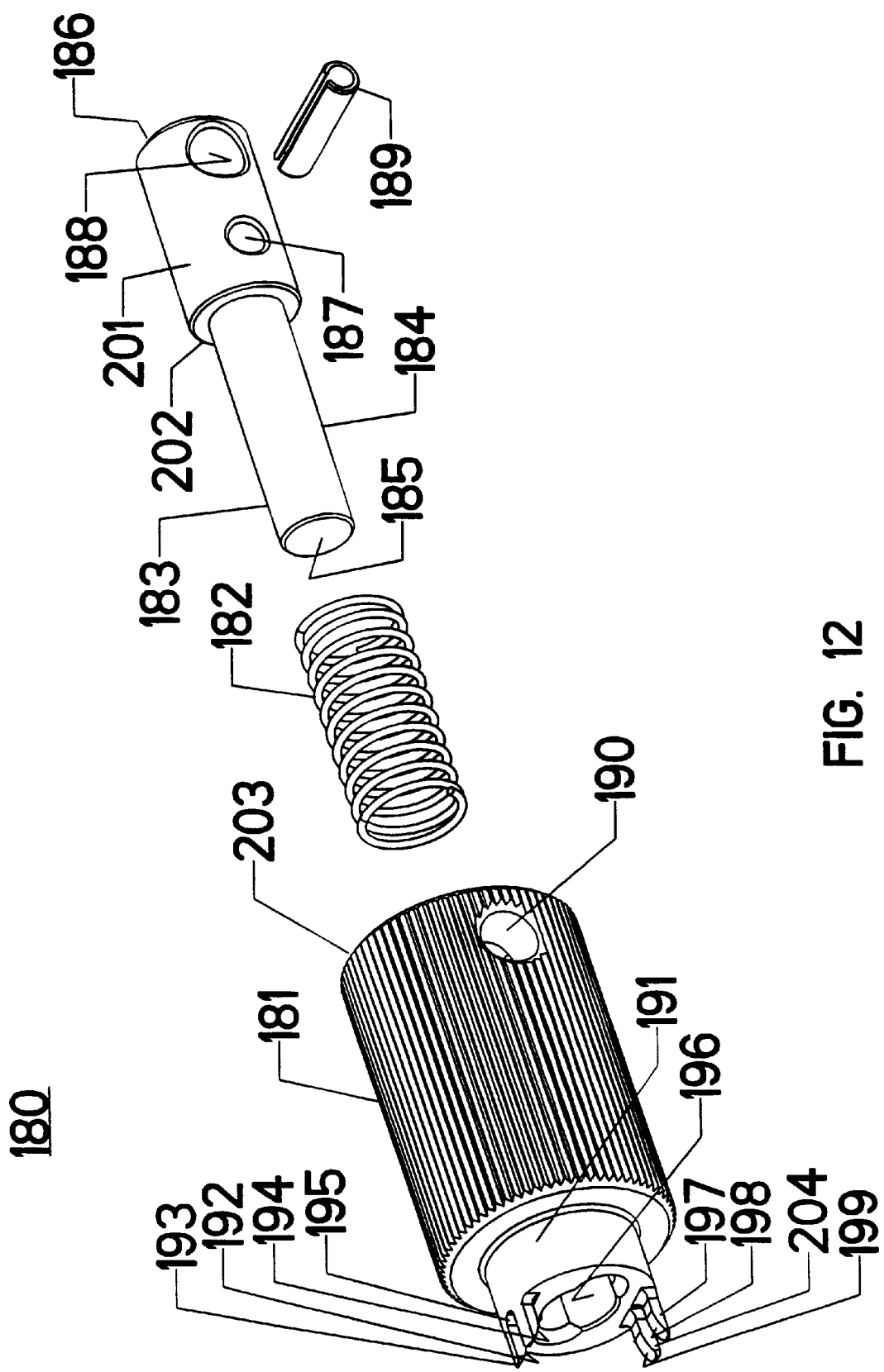
FIG. 12 is an exploded, perspective view of the plug insert insertion/removal tool.

FIG. 12 is an exploded, perspective view of the plug insert insertion/removal tool 180. FIG. 12 shows components of the insertion/removal tool 180 including the tool body 181, the tool spring 182, the plunger 183, and the pin 189. The plunger 183 includes a large diameter region 201, a small diameter region 184, a release surface 185, an actuation surface 186, a plunger spring seat 202, a lanyard receiving aperture 188, and a pin receiving aperture 187. The tool body 181 includes a first end 191, a second end 203, a pin travel aperture 190, a main aperture 196, a first friction grip 192, and a second friction grip 197. The first friction grip 192 includes a first tong 193, a second tong 194, and a first nub receiving slot 195 located between the first and second tongs 193, 194. The second friction grip 197 includes a third tong 198, a fourth tong 199, and a second nub receiving slot 204 positioned between the third and fourth tongs 198, 199.

As is evident from FIG. 12, one end of the tool spring 182 slides over the small diameter region 184 of the plunger 183 so as to contact the plunger spring seat 202 of the plunger 183. Furthermore, the tool spring 182 and the small diameter region 184 of the plunger 183 are inserted into the main aperture 196 of the tool body 181. Also, a portion of the large diameter region 201 of the plunger 183 is inserted into the main aperture 196 of the tool body 181. Then the plunger 83 is introduced into the main aperture 196 of the tool body 181 until the pin receiving aperture 187 of the plunger 183 aligns with the pin travel aperture 190 of the tool body 181. At that time, the pin 189 is introduced into the pin travel aperture 190 and the pin receiving aperture 187. The pin 189 is press fitted into the pin receiving aperture 187. The pin 189 is the final assembly position when the pin 189 is at least partially engaged in the plunger 183 and in the pin travel aperture 190.

Figure 13:
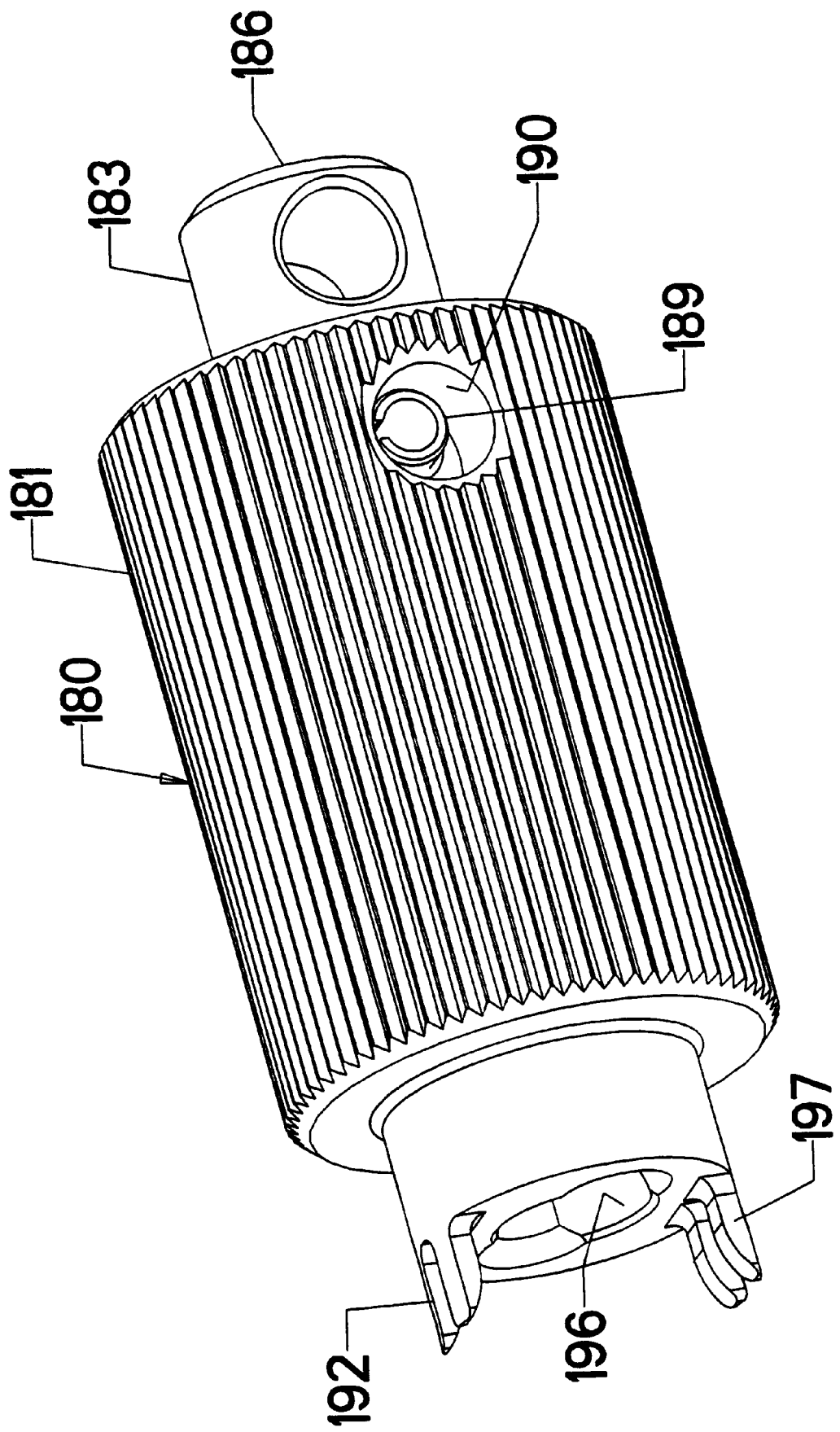
FIG. 13 is an assembled, perspective view of the insertion/removal tool of FIG. 12.

FIG. 13 is an assembled, perspective view of the insertion/removal tool 180 of FIG. 12. In practice, the operator applies a force to the actuation surface 186 of the plunger 183. The actuation force must be large enough so as to overcome the spring force of the tool spring 182. At that time, the plunger 183 compresses the tool spring 182 so as to allow the small diameter region 184 of the plunger 183 to contact the alignment sleeve extension 23. The plunger 183 is able to travel the distance equal to the difference in diameters of the pin travel aperture 190 and the outside diameter of the pin 189. The amount of travel of the plunger 183 is at least as great as the length of the first and second nub receiving slots 195, 204. The outer surface of the tool body 181 has a textured surface pattern so as to enhance gripping of the insertion/removal tool 180. FIG. 13 further shows the cammed or sliding surfaces of the tongs of the first and the second friction grips 192, 197.

Figure 14:
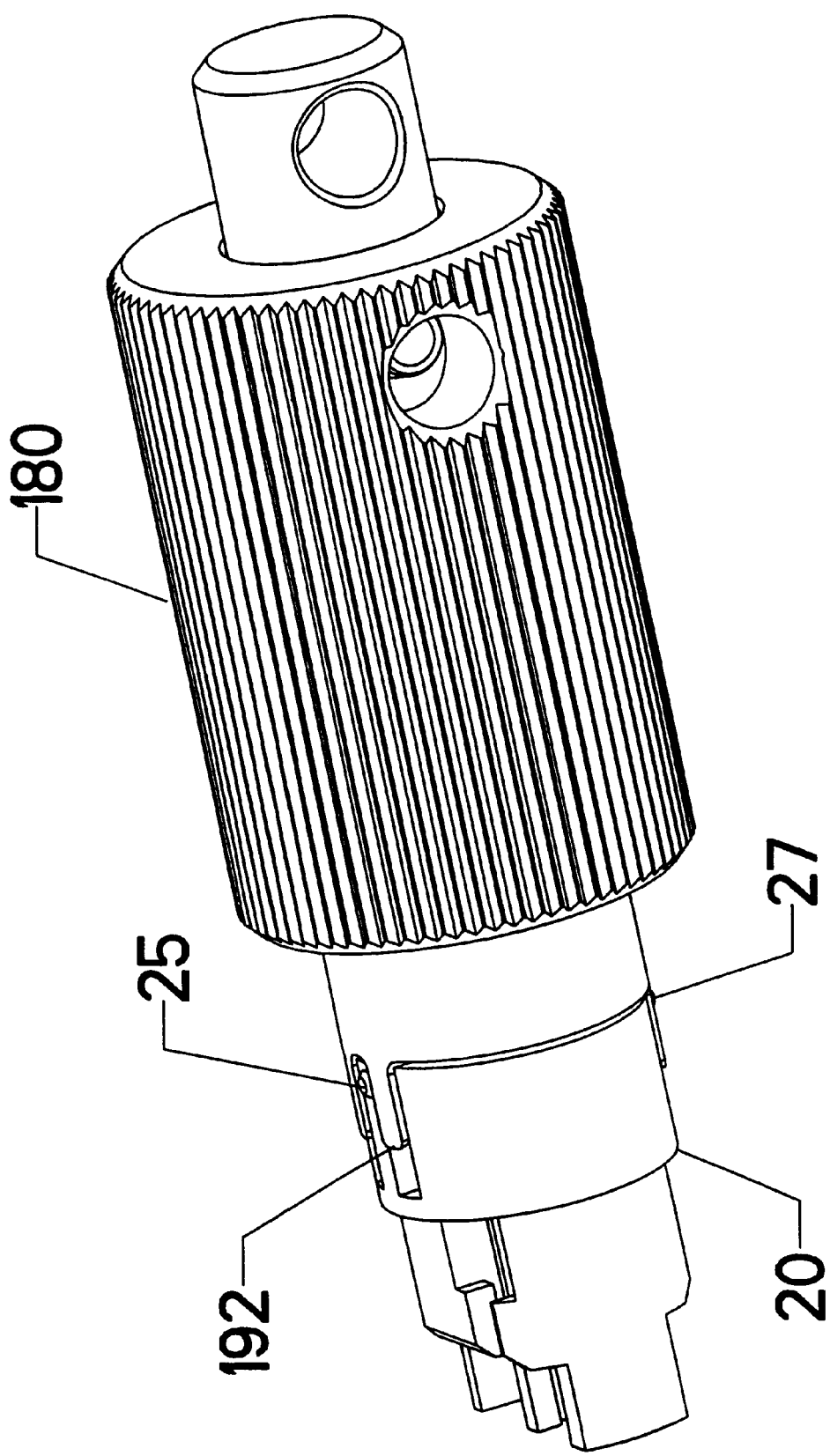
FIG. 14 is a perspective view of the insertion/removal tool holding the plug insert.

FIG. 14 is a perspective view of the insertion/removal tool 180 holding a plug insert 20. As shown in FIG. 14, the nub feature 25 of the plug insert 20 is positioned in the nub receiving slot of the first friction grip 192.

The cammed or sliding surfaces of the tongs of the first and second friction grips 192, 197 engage the tool slide surfaces 33, 34, 35, and 36 of the plug insert 20 so as to push the opposing nub features 25, 27 towards each other and ensures that the farthermost portions of the nub features 25, 27 do not protrude beyond the main body portion of the plug insert 20.

Figure 15:
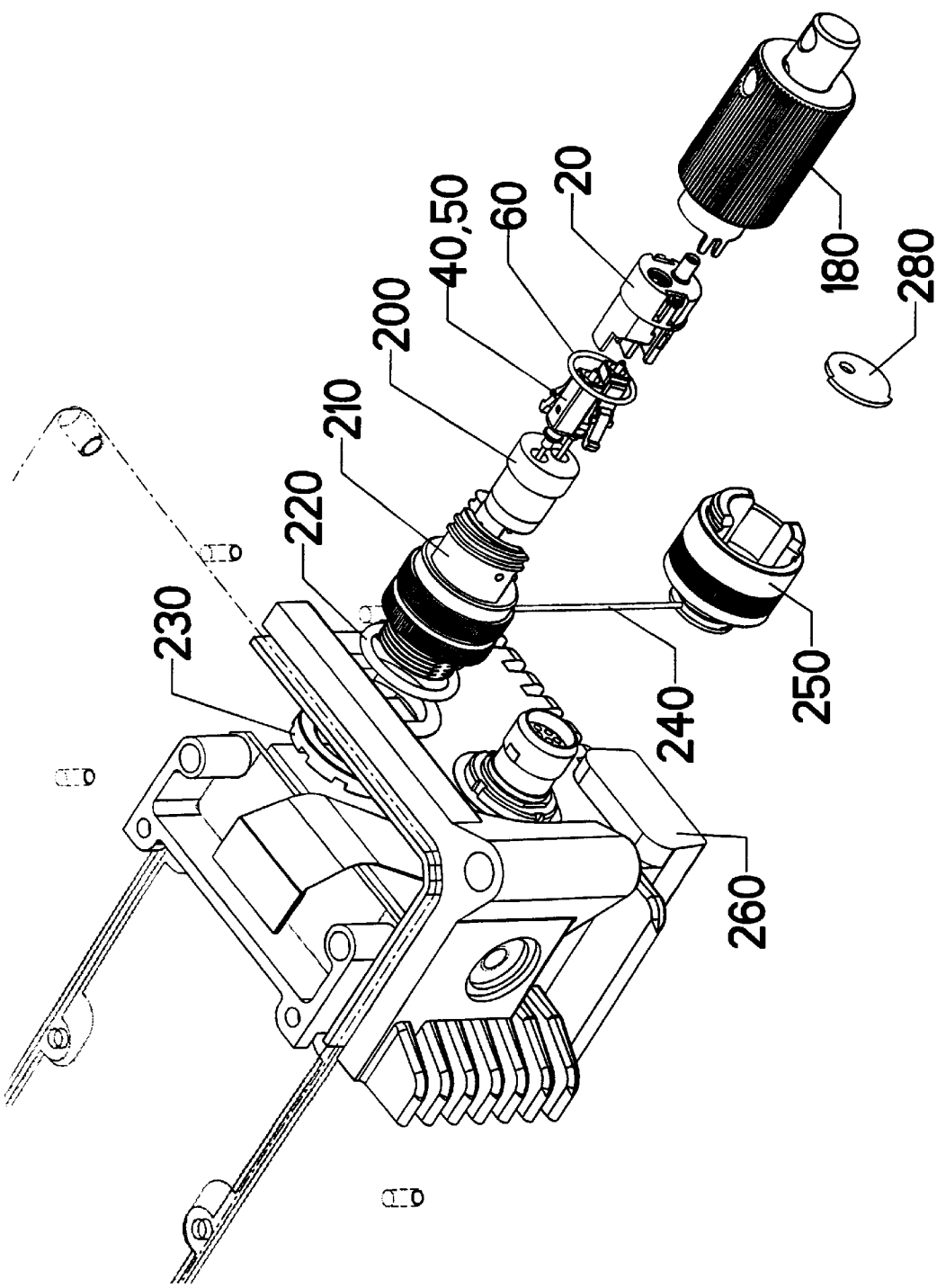
FIG. 15 is an exploded, perspective view of another embodiment of the termination device of the invention for attaching to a tactical access unit, also shown is an insertion/removal tool.

FIG. 15 is an exploded, perspective view of another embodiment of the termination device of the invention for attaching to a tactical access unit 260. The method of assembly is essentially the same as previously described. However, the housing 210 is mounted to the tactical access unit 260 and secured thereby by a mounting nut 230 which is threadedly engaged onto complementary threads located on the housing 210. Also provided is a fiber seal 200 which goes through the housing 210 and through which optical fibers are passed. The insertion/removal tool 180 is also shown. Once the plug insert 20 and the remaining components of the termination device are assembled, a cap seal 280 is introduced into a dust cap 250 which is attached to the housing 210 by way of a lanyard 240. The dust cap 250 is designed to mate with the keys of the housing 210 and to threadedly engage the threads on the keys of the housing 210 so as to protect the ferrules of the connectors 40, 50 from debris. The cap seal 28 adds further protection to the ferrules by sealing the apertures in which the ferrules reside. The use of the termination device of the invention as a component of a tactical access unit 260 is important, since the plug insert 20 and the ferrules of fiber optic connectors 40, 50 can be repaired or replaced. The insertion/removal tool 180 can remove the plug insert 20 from the housing 210. Then, the plug insert 20 can be replaced or repaired and the connectors 40, 50 and their associated ferrules can be replaced or repaired and then reassembled. All of this can be done without entering the inside of the tactical access unit 260. The tactical access unit 260 can remain in an assembled state without the operator gaining access to the critical components contained therein. Thus, all of the repair work to the connecting device is performed without reaching into the enclosure of the tactical access unit 260.

Figure 16:
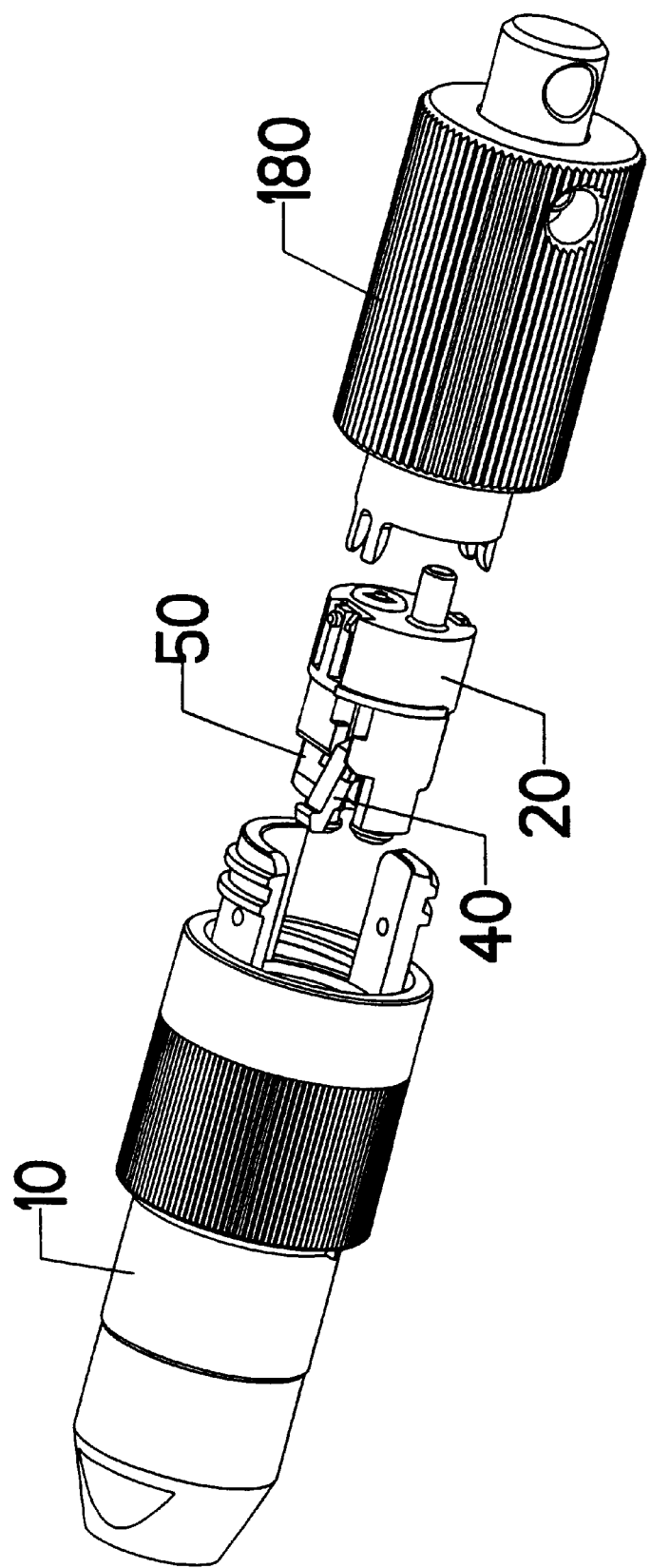
FIG. 16 is a perspective view of the insertion/removal tool, the plug insert, fiber optic connectors, and the housing of FIG. 1.

FIG. 16 is a perspective view of the insertion/removal tool 180, the plug insert 20, fiber optic connectors 40, 50, and the housing 70 of the termination device 10. In practice, the insertion/removal 180 engages the spring latches 24, 26 of the plug insert 20 and then proceeds to insert the plug insert 20 into the housing 70.

Figure 17:
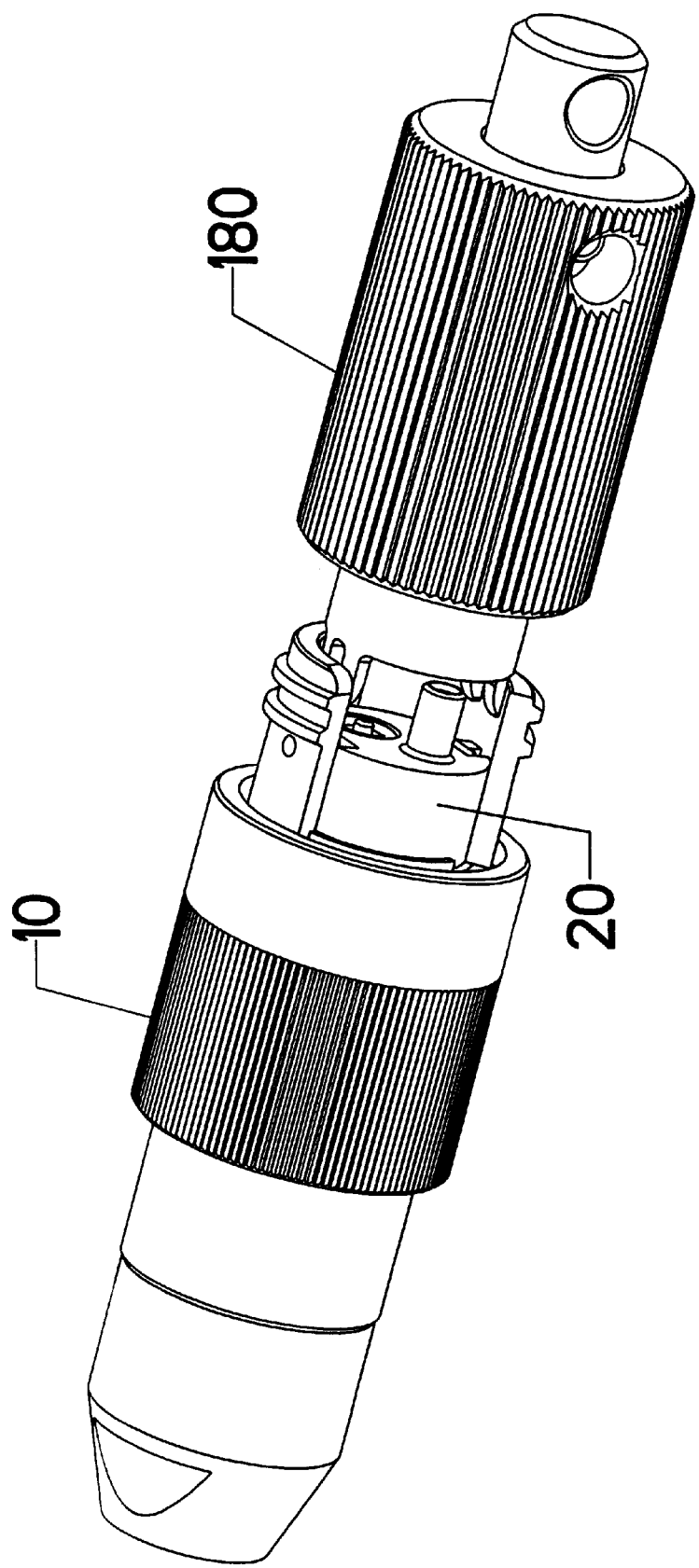
FIG. 17 is a perspective view of the assembly of FIG. 16 with the components engaged.

FIG. 17 is a perspective view of the assembly shown of FIG. 16 with the components engaged. In this position, the insertion/removal 180 is being removed from the assembled components.

As discussed earlier, during insertion, the insertion/removal tool 180 is attached to the plug insert 20 and then the assembly is oriented so as to position the ridge 31 of the plug insert 20 and nub feature 25 between the first and second keys 71, 73. There, the ridge 31 and nub feature 25 are positioned over the stopping surface 78 of the housing 70. The insertion/removal tool 180 and the plug insert 20 are then introduced into the housing 70 until the ridge 31 contacts stopping surface 78 of the housing 70. At that time, the insertion/removal tool 180 is rotated in the only direction possible which is to align the nub feature 25 with the closest locking hole 75B of the housing 70. Once the nub features 25, 27 are aligned with the locking holes 75A, 75B, the actuation surface 186 of the plunger 183 of the insertion/removal tool 180 is depressed while the main body 181 is moved towards the operator. The main body 181 of the insertion/removal tool 180 is further moved relative to the plunger 183 until the friction grips 192, 197 release the tool sliding surfaces 33, 34, 35 and 36 of the cantilevered spring latches 24, 26 of the plug insert 20. Then, the cantilevered spring latches 24, 26 of the plug insert 20 are free to expand their associated nub features 25 and 27, where the nub features 25, 27 are introduced into the locking hole 75A and 75B, thus, locking the plug insert 20 into the housing 70. The assembly and/or repair of the connectors 40, 50, ferrules 54, 44, and the plug insert 20 is then complete.

Removal of the plug insert 20 is substantially the reverse of the insertion procedure. The insertion/removal tool 180 is introduced to the termination device 10 so as to engage the friction grips with the tool sliding surfaces of the plug insert. Once the insertion/removal tool 180 is fully engaged with the plug insert 20 the nub features 25, 27 are removed from the locking holes 75A, 75B. At that time, the insertion/removal tool 180 can be rotated, thus rotating the plug insert 20 so as to expose the nub features 25, 27 between the keys 71, 73 of the housing. Then, the insertion/removal tool 180 can be removed while it carries the plug insert. The removal and/or repair of the connectors 40, 50, ferrules 54, 44, and the plug insert 20 is then complete.

The preferred materials of construction for the termination device 10 are as follows: the grip ring 100 is an aluminum alloy, the housing 70 is an aluminum alloy, the crimp sleeve 170 is an arcap ap1D, the insert coupling 20 is a PEEK polymer, the retainer 21 is a polymer, the alignment sleeve is a copper alloy, the extension sleeve 80 is an aluminum alloy, the cover tube 110 is an aluminum alloy, the rear end plug 150 is an aluminum alloy, the seals 39, middle seal 60, the grip seal 90, the rear seal 130, and cable seal 140 are a resilient elastomeric compound, the ferrules 42, 52 are a ceramic material. The lanyard 240 is a metallic wire rope covered with a polymer, the dust cap 250 is a polymer, the cap seal 280 is an elastomeric compound. Various other components are constructed of suitable engineering materials. The preferred materials of construction for the insertion/removal tool 180 are as follows: the tool body 180 is a passivated 303 stainless steel, the tool spring 182 is a metallic material, the plunger 183 is a metallic material. Thus, the materials of construction provide a termination device which is robust and which withstands the rigors of a hostile battlefield environment.

Obviously, numerous modifications and variations of the present invention are possible in light of the above teachings. It is therefore to be understood that within the scope of the appended claims, the invention may be practiced otherwise than as specifically described herein.

What is claimed is:

1. A hermaphroditic cable or waveguide termination device for optical fibers, the termination device comprising:

a housing having locking holes, the housing having a front end, the front end having mating structures which are substantially identical to and mateable with a mating structure of a front end of another housing; and a plug insert removably provided in the housing through the front end of the housing, the plug insert having optical connector ports, each of the optical connector ports dimensioned so as to receive a respective optical assembly where each optical assembly has a respective optical ferrule which aligns a respective optical fiber, the plug insert having a substantially cylindrical surface and a first surface substantially perpendicular to the cylindrical surface, the plug insert having nub features provided in a region of the cylindrical surface for mating with the locking holes, the first surface having a first ferrule port and a second ferrule port, the first ferrule port having a plug insert extension projecting from the first surface, the second ferrule port dimensioned so as to receive a plug insert extension of another plug insert, the first optical connector receiving port communicating with the second ferrule port, the second optical connector receiving port communicating with the first ferrule port.

2. The hermaphroditic termination device according to claim 1 wherein each of the nub features is connected to the plug insert with a respective spring latch.

3. The hermaphroditic termination device according to claim 2 wherein each spring latch is cantilevered to the plug insert.

4. The hermaphroditic termination device according to claim 3 wherein the second ferrule port has a first seal provided therein.

5. The hermaphroditic termination device according to claim 4 wherein the cylindrical surface of the plug insert has a ridge feature.

6. The hermaphroditic termination device according to claim 5 wherein the front end of the housing has a stopping surface, wherein the ridge of the plug insert is adjacent the stopping surface when the plug insert is inserted into the housing.

7. The hermaphroditic termination device according to claim 6 wherein the plug insert extension of the plug insert has a retainer provided partially therein.

8. The hermaphroditic termination device according to claim 7 wherein the retainer of the plug insert has an alignment sleeve provided partially therein.

9. The hermaphroditic termination device according to claim 8 wherein the alignment sleeve in the plug insert is dimensioned so as to accommodate the fiber optic ferrule.

10. The hermaphroditic termination device according to claim 9 wherein the mating structures of the housing have threadforms formed thereon.

11. The hermaphroditic termination device according to claim 10 wherein the mating structures of the housing include a first key and a second key.

12. The hermaphroditic termination device according to claim 11 wherein the first key is separated from the second key by an arc length of approximately sixty degrees on one side and by an arc length of approximately one-hundred-twenty degrees on another side of the first key.

13. The hermaphroditic termination device according to claim 12 wherein the first key has an arc length of approximately sixty degrees and the second key has an arc length of approximately one-hundred-twenty degrees.

14. The hermaphroditic termination device according to claim 13 wherein the locking holes of the housing are diametrically opposed to each other.

15. The hermaphroditic termination device according to claim 14 wherein the housing has an inner diameter surface.

16. The hermaphroditic termination device according to claim 15 wherein the inner diameter surface has a second o-ring groove.

17. The hermaphroditic termination device according to claim 16, further comprising a second o-ring provided in the second o-ring groove, the second o-ring situated against the cylindrical surface of the plug insert.

18. The hermaphroditic termination device according to claim 17, further comprising a cover tube surrounding a portion of the housing, the cover tube having a first end, the first end having a first undulating surface.

19. The hermaphroditic termination device according to claim 18, further comprising a grip ring slidably and rotationally surrounding a portion of the cover tube, the grip ring having a second end, the second end having a second undulating surface, the first undulating surface of the cover tube adjacent to the second undulating surface of the grip ring so as to emminate an audible indication of the grip ring situated in a closed position.

20. The hermaphroditic termination device according to claim 1 wherein each optical ferrule has a diameter of substantially 1.25 mm.

\* \* \* \* \*